(12) United States Patent
Kniess et al.

(10) Patent No.: US 6,727,308 B2
(45) Date of Patent: Apr. 27, 2004

(54) LASER-MARKABLE PLASTICS

(75) Inventors: Helge Kniess, Weiterstadt (DE); Dieter Heinz, Heppenheim (DE); Reiner Delp, Darmstadt (DE); Gerhard Pfaff, Munster (DE); Matthias Kuntz, Seeheim-Jugenheim (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 26 days.

(21) Appl. No.: 09/833,708

(22) Filed: Apr. 13, 2001

(65) Prior Publication Data

US 2001/0030179 A1 Oct. 18, 2001

(30) Foreign Application Priority Data

Apr. 14, 2000 (DE) .......................................... 100 18 600

(51) Int. Cl.$^7$ ................................................. C08K 3/10
(52) U.S. Cl. ...................... 524/437; 524/492; 524/436; 524/439; 524/445; 524/449; 523/210
(58) Field of Search .......................... 524/80, 439, 443, 524/440, 449, 437, 436, 432; 523/210, 216, 217, 200, 110

(56) References Cited

U.S. PATENT DOCUMENTS

| 5,496,630 | A | * | 3/1996 | Hawrylko et al. | .......... 428/328 |
| 5,951,750 | A | * | 9/1999 | Zimmermann et al. | ..... 106/417 |
| 6,214,917 | B1 | * | 4/2001 | Linzmeier et al. | .......... 524/430 |
| 6,291,551 | B1 | * | 9/2001 | Kniess et al. | ............... 523/216 |
| 6,294,010 | B1 | * | 9/2001 | Pfaff et al. | |
| 6,521,688 | B1 | * | 2/2003 | Linzmeier et al. | .......... 524/430 |
| 2001/0021731 | A1 | * | 9/2001 | Kniess et al. | ............... 523/215 |
| 2002/0068773 | A1 | * | 6/2002 | Solms et al. | ................ 523/171 |
| 2002/0107305 | A1 | * | 8/2002 | Edler | ......................... 523/171 |

* cited by examiner

*Primary Examiner*—Katarzyna Wyrozebski
(74) *Attorney, Agent, or Firm*—Millen, White, Zelano & Branigan, P.C.

(57) ABSTRACT

The present invention relates to laser-markable plastics of which a feature is that they comprise as dopant
at least one metal powder and/or semimetal powder selected from the group consisting of aluminum, boron, titanium, magnesium, copper, tin, silicon and zinc and
one or more effect pigments based on phyllosilicates.

24 Claims, No Drawings

LASER-MARKABLE PLASTICS

The present invention relates to laser-markable plastics of which a feature is that they comprise as dopant at least one metal powder and/or semimetal powder selected from the group consisting of aluminium, boron, titanium, magnesium, copper, tin, silica and zinc and one or more effect pigments based on phyllosilicates.

The identity marking of production goods is becoming increasingly important across almost all sectors of industry. For example, it is frequently necessary to apply production dates, expiry dates, bar codes, company logos, serial numbers, etc., to plastics or polymer films. At the present time, these marks are made predominantly using conventional techniques such as printing, embossing, stamping and labelling. Growing importance is being acquired, however, by contactless, high-speed and flexible marking using lasers, especially in the case of plastics. This technique makes it possible to apply graphic inscriptions, such as bar codes, at high speed even to a non-planar surface. Since the inscription is within the plastics article itself, it is durably abrasion-resistant.

Many plastics, such as polyolefins and polystyrenes, for example, have to date proved to be very difficult or even impossible to mark by means of laser. A $CO_2$ laser which emits light in the infrared region at 10.6 μm produces only a faint, barely legible mark on polyolefins and polystyrenes, even at very high output levels. In the case of the elastomers, polyurethane and polyether esters, there is no interaction with Nd-YAG lasers, whereas with $CO_2$ lasers engraving occurs. The plastic must not completely reflect or transmit the laser light, since if it did so there would be no interaction. However, there must also not be strong absorption, since in that case the plastic would evaporate to leave only an engraving. The absorption of the laser beams, and hence the interaction with the material, is dependent on the chemical structure of the plastic and on the laser wavelength used. In many cases it is necessary to add appropriate additives, such as absorbers, in order to render plastics laser-inscribable.

For the laser identity marking of plastics, use is increasingly being made, besides $CO_2$ lasers, of Nd:YAG lasers. The YAG lasers commonly used emit a pulsed energy beam having a characteristic wavelength of 1064 nm or 532 nm. The absorber material must exhibit pronounced absorption within this specific NIR range in order to show a sufficient reaction in the rapid inscription processes.

The dopants known from the prior art, however, all have the disadvantage that they persistently color the plastic that is to be inscribed, with the consequence that the laser inscription, which is usually a dark text on a light background, lacks sufficient contrast. Moreover, they have to be added at comparatively high concentrations, and in many cases are toxicologically unacceptable.

It was an object of the present invention, therefore, to find laser-markable plastics which permit high-contrast marking on exposure to laser light. The filler, or the successful absorber, should therefore possess a very pale intrinsic color or should need to be used only in very small amounts.

Upon further study of the specification and appended claims, further objects and advantages of this invention will become apparent to those skilled in the art.

It has surprisingly been found that the laser markability of plastics, and in particular the contrast of the marking, may be improved by using a mixture comprising metal or semimetal powder and one or more effect pigments based on phyllosilicates.

The laser marking of plastics with pearl lustre pigments was first described in Speciality Chemicals, Pearl Lustre Pigments—Characteristics and Functional Effects—May 1982.

Through the addition of a metal or semimetal powder in concentrations of from, for example, 0.5 to 10% by weight, preferably from 0.5 to 7% by weight, and in particular from 0.5 to 5% by weight, based on the effect pigment, a significantly higher contrast is achieved in the laser marking of thermoplastics.

The invention accordingly provides a laser-markable plastic, characterized in that the thermoplastic comprises as dopant at least one metal powder or semimetal powder, preferably selected from the group consisting of aluminum, boron, titanium, magnesium, copper, tin, silicon and zinc, and one or more effect pigments based on phyllosilicates. Besides boron and silicon, other possible semi-metals are Sb, As, Bi, Ge, Po, Se and Te.

The concentration of the dopant in the plastic is dependent, however, on the plastics system used. A too small fraction of dopant does not significantly alter the plastics system and does not influence its processability. Of the metal or semimetal powders mentioned, silicon powder is preferred. Besides the effect pigment, metal or semimetal powder mixtures may also be used as dopant. The mixing ratio of metal to semi-metal is preferably from 1:10 to 10:1, but the metal and/or semimetal powders may be mixed with one another in any ratio. Preferred metal powder mixtures are: silicon/boron, silicon/aluminium, boron/aluminium and silicon/zinc.

In certain compositions of the dopant, the addition also of small amounts of a metal halide, preferably calcium chloride, is advantageous for the contrast of the laser marking of the plastic.

Transparent thermoplastics comprising the aforementioned dopants in straight coloring exhibit a slightly metallic glimmer but retain their transparency. This metallic gleam, especially in the case of polyolefins, may be completely masked if required by the addition of from 0.2 to 10% by weight, preferably from 0.5 to 3% by weight, of hiding pigments, such as titanium dioxide, for example. Furthermore, colorants may be added to the plastics, permitting color variations of any kind and at the same time ensuring retention of the laser marking. Appropriate colorants include, in particular, colored metal oxide pigments and also organic pigments and dyes.

The effect pigments suitable for marking are based preferably on platelet-shaped substrates, preferably transparent or semitransparent substrates comprising, for example, phyllosilicates, such as synthetic or natural mica, talc, kaolin or sericite, for instance. However, the effect pigments may also comprise glass flakes, $SiO_2$ platelets, $Al_2O_3$ platelets and/or $TiO_2$ platelets.

Particularly preferred substrates are mica flakes coated with one or more metal oxides. Metal oxides used in this context include both colorless metal oxides of high refractive index, such as, in particular, titanium dioxide and/or tin oxide, and colored metal oxides, such as antimony-tin oxide, iron oxide ($Fe_2O_3$, $Fe_3O_4$) and/or chromium(III) oxide, for example. In addition, it is also possible for oxide layers of low refractive index to be present in the pigment structure, such as silicon dioxide for example.

Platelet-shaped pigments are known and to a very large extent are available commercially, for example under the brand name Iriodino® from Merck KGaA, or may be prepared by standard methods known to the person skilled in the art. Effect pigments based on transparent or semitransparent, platelet-shaped substrates are described, for example, in the German patents and patent applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017 and 38 42 330.

Particularly suitable effect pigments are those having the following structure:

mica+$SnO_2$+$TiO_2$
mica+$TiO_2$
mica+$TiO_2$+$Fe_2O_3$
mica+$TiO_2$+$(Sn,Sb)O_2$.

All known thermoplastics, as described for example in Ullmann, vol. 15, p. 457, Verlag VCH may be employed for laser marking. Examples of suitable plastics are polyethylene, polypropylene, polyamides, polyesters, polyester esters, polyether esters, polyphenylene ethers, polyacetal, polybutylene terephthalate, polymethyl methacrylate, polyvinyl acetal, polystyrene, acrylonitrile-butadiene-styrene (ABS), acrylonitrile-styrene-acrylate (ASA), polycarbonate, polyether sulphones and polyether ketones, and also their copolymers and/or blends.

The amount of the dopant, i.e., mixture of metal or semi-metal powder and effect pigment, to be included in the thermoplastic is preferably from 0.1 to 10 percent by weight, more preferably 0.3 to 3 percent by weight, based on the weight of the thermoplastic.

The incorporation of the effect pigments and of the metal and/or semimetal powder into the thermoplastic takes place by mixing the plastics granules with the dopant and then shaping the mixture under the action of heat. The addition of the metal and/or semimetal powder and, respectively, of the powder mixture and the effect pigment to the plastic may take place simultaneously or successively. During the incorporation of the dopant, any tackifiers, organic, polymer-compatible solvents, stabilizers and/or surfactants that are thermally stable under the operating conditions may be added to the plastics granules. The doped plastics granules are generally prepared by introducing the plastics granules into an appropriate mixer, wetting them with any additives, and then adding the dopant and mixing it in. The plastic is generally pigmented by way of a color concentrate (masterbatch) or compounded formulation. The mixture obtained in this way may then be processed directly in an extruder or an injection molding machine. The molds formed in the course of processing exhibit a very homogeneous distribution of the dopant. Subsequently, laser marking takes place with an appropriate laser.

The invention additionally provides a process for producing the laser-markable plastics of the invention, characterized in that a thermoplastic is mixed with a dopant and then shaped under the action of heat.

Inscription with the laser is carried out by introducing the sample structure into the beam path of a pulsed laser, preferably an Nd:YAG laser. Inscription with an excimer laser, by way of a mask technique, for example, is a further possibility. However, the desired results may also be achieved with other conventional laser types featuring a wavelength in a range of high absorption for the pigment used. The marking obtained is determined by the exposure time (or pulse count in the case of pulsed lasers) and irradiation output of the laser and by the plastics system used. The output of the lasers used depends on the particular application and may readily be determined in each individual case by the person skilled in the art.

The laser used generally has a wavelength in the range from 157 nm to 10.6 µm, preferably in the range from 532 nm to 10.6 µm. Mention may be made here, for example, of $CO_2$ lasers (10.6 µm) and Nd:YAG lasers (1064 or 532 nm) or pulsed UV lasers. The excimer lasers have the following wavelengths: $F_2$ excimer lasers (157 nm), ArF excimer lasers (193 nm), KrCl excimer lasers (222 nm), KrF excimer lasers (248 nm), XeCl excimer lasers (308 nm), XeF excimer lasers (351 nm), frequency-multiplied Nd:YAG lasers with wavelengths of 355 nm (frequency-tripled) or 265 nm (frequency-quadrupled). Particular preference is given to using Nd:YAG lasers (1064 or 532 nm) and $CO_2$ lasers. The energy densities of the lasers used are generally in the range from 0.3 mJ/cm$^2$ to 50 J/cm$^2$, preferably from 0.3 mJ/cm$^2$ to 10 J/cm$^2$. When using pulsed lasers, the pulse frequency is generally in the range from 1 to 30 kHz. Corresponding lasers which may be used in the process of the invention are available commercially.

The plastic pigmented in accordance with the invention may be used in all fields where customary printing processes have hitherto been used to inscribe plastics. For example, molding made from the plastic of the invention may be employed in the electrical, electronics and motor vehicle industries. The identity marking and inscription of, for example, cables, lines, trim strips and functional components in the heating, ventilation and cooling sectors, or switches, plugs, levers and handles, comprising the plastic of the invention, may be marked with the aid of laser light, even at difficult-to-reach points. Furthermore, the plastics system of the invention may be used for packaging in the food sector or in the toy sector. The markings on the packaging are notable for their resistance to wiping and scratching, for their stability during subsequent sterilization processes, and for the fact that they can be applied in a hygienically pure manner in the marking process. Complete label motifs may be applied durably to the packaging for a reusable system. Another important area of application for laser inscription is that of plastic tags for the individual identity marking of animals, known as cattle tags or ear-marks. By means of a bar code system, the information pertaining specifically to the animal is stored. On demand, this information can be called up again using a scanner. The inscription must be extremely durable, since the mark will remain on the animals for in some cases several years.

The laser marking of plastics articles or molding comprising the plastic of the invention is hence possible.

The entire disclosures of all applications, patents and publications, cited above, and of corresponding German Application No. DE 10018600.9, filed Apr. 14, 2000 is hereby incorporated by reference.

In the foregoing and in the following examples, all temperatures are set forth uncorrected in degrees Celsius; and, unless otherwise indicated, all parts and percentages are by weight.

EXAMPLES

Example 1

10 g of Iriodin® 103 ($TiO_2$-coated mica pigment from Merck KGaA, Darmstadt, Germany) are mixed with 0.2 g of silicon powder (product of Merck KGaA) and 0.07 g of anhydrous $CaCl_2$.

PP granules (pp-HD, Stamylen PPH 10 from DSM) are processed by injection molding with the addition of 0.5% of the mixture prepared. Following inscription with a $CO_2$ laser, the plaques exhibit a dark, abrasion-resistant and high-contrast inscription.

Example 2

10 g of Minateco® 30 CM ($TiO_2$-mica pigment with an antimony-tin oxide layer from Merck KGaA) are mixed with 0.2 g of silicon powder (product of Merck KGaA) and 0.07 g of anhydrous $CaCl_2$.

PP granules (pp-HD, Stamylen PPH 10 from DSM) are processed by injection molding with the addition of 0.5% of the mixture prepared. Following inscription with an Nd:YAG laser, the plaques exhibit a dark, abrasion-resistant and high-contrast inscription.

Example 3

10 g of Iriodin® 103 ($TiO_2$-coated mica pigment from Merck KGaA, Darmstadt, Germany) are mixed with 0.2 g of zinc powder (product of Merck KGaA).

PP granules (pp-HD, Stamylen PPH 10 from DSM) are processed by injection molding with the addition of 0.5% of the mixture prepared. Following inscription with a $CO_2$ laser, the plaques exhibit a dark, abrasion-resistant and high-contrast inscription.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A laser-markable plastic, which comprises a thermoplastic and a dopant, the dopant comprising:
    at least one metal powder and/or semimetal powder which comprises a mixture of silicon/aluminum or boron/aluminum, and
    one or more phyllosilicate effect pigment.

2. A laser-markable plastic according to claim 1, wherein the fraction of metal powder and/or semimetal powder in the dopant is from 0.5 to 10% by weight, based on the weight of the effect pigment.

3. A laser-markable plastic according to claim 1, wherein the thermoplastic is a polyethylene, polypropylene, polyamide or polyester.

4. A laser-markable plastic according to claim 1, wherein the plastic further comprises a color pigment.

5. A laser-markable plastic according to claim 1, wherein the amount of dopant is from 0.1 to 10 percent by weight based on the weight of the thermoplastic.

6. A laser-markable plastic according to claim 1, wherein the dopant contains at least one additional metal powder and/or semimetal powder selected from the group consisting of boron, titanium, magnesium, copper, tin, silicon, zinc and mixtures thereof.

7. A laser-markable plastic according to claim 1, wherein the dopant further comprises a metal halide.

8. A laser-markable plastic according to claim 1, wherein the effect pigment is natural or synthetic mica platelets pearl luster pigment.

9. A laser-markable plastic according to claim 8, wherein the pearl luster pigment is a mica pigment coated with $TiO_2$ and/or with antimony-tin oxide.

10. A plastic shaped molding comprising the laser-markable plastic according to claim 1.

11. A process for producing a laser-markable plastic according to claim 1, which comprises adding the metal powder and/or semimetal powder and, respectively, mixtures thereof and one or more effect pigments, simultaneously or successively, and any further auxiliaries to the thermoplastic and then shaping the plastic under the action of heat.

12. A method for laser marking a plastic which comprises subjecting a laser-markable plastic of claim 1 to a laser beam to leave discernible markings on the plastic where subject to the laser beam.

13. The method of claim 12, wherein the laser is a Nd:YAG laser.

14. The method of claim 12, wherein the laser marking is in the form of a bar code.

15. A laser-markable plastic which comprises a thermoplastic and a dopant, the dopant comprising:
    at least one metal powder and/or semimetal powder which is silicon and
    one or more phyllosilicate effect pigment.

16. A laser-markable plastic according to claim 15, wherein the effect pigment is natural or synthetic mica platelets pearl luster pigment.

17. A laser-markable plastic according to claim 16, wherein the pearl luster pigment is a mica pigment coated with $TiO_2$ and/or with antimony-tin oxide.

18. A plastic shaped molding comprising the laser-markable plastic according to claim 15.

19. A method for laser marking a plastic which comprises subjecting a laser-markable plastic of claim 15 to a laser beam to leave discernible markings on the plastic where subject to the laser beam.

20. A laser-markable plastic, which comprises a thermoplastic and a dopant, the dopant comprising:
    at least one metal powder and/or semimetal powder selected from the group consisting of aluminum, boron, titanium, magnesium, copper, tin, silicon, zinc and mixtures thereof, and
    one or more phyllosilicate effect pigment,
    wherein the dopant further comprises a metal halide.

21. A laser-markable plastic according to claim 20, wherein the effect pigment is natural or synthetic mica platelets pearl luster pigment.

22. A laser-markable plastic according to claim 21, wherein the pearl luster pigment is a mica pigment coated with $TiO_2$ and/or with antimony-tin oxide.

23. A plastic shaped molding comprising the laser-markable plastic according to claim 20.

24. A method for laser marking a plastic which comprises subjecting a laser-markable plastic of claim 20 to a laser beam to leave discernible markings on the plastic where subject to the laser beam.

* * * * *